(12) United States Patent
Hoshino et al.

(10) Patent No.: US 9,298,036 B2
(45) Date of Patent: Mar. 29, 2016

(54) IDENTIFICATION MEDIUM

(75) Inventors: Hidekazu Hoshino, Yokohama (JP); Itsuo Takeuchi, Yokohama (JP); Seiya Shibuya, Yokohama (JP); Tooru Ida, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 302 days.

(21) Appl. No.: 14/006,038

(22) PCT Filed: Mar. 8, 2012

(86) PCT No.: PCT/JP2012/055977
§ 371 (c)(1),
(2), (4) Date: Oct. 7, 2013

(87) PCT Pub. No.: WO2012/128057
PCT Pub. Date: Sep. 27, 2012

(65) Prior Publication Data
US 2014/0022493 A1    Jan. 23, 2014

(30) Foreign Application Priority Data

Mar. 18, 2011 (JP) ................................ 2011-061184

(51) Int. Cl.
*G03H 1/00* (2006.01)
*G02F 1/1335* (2006.01)
(Continued)

(52) U.S. Cl.
CPC .......... *G02F 1/133553* (2013.01); *B42D 25/00* (2014.10); *B42D 25/29* (2014.10);
(Continued)

(58) Field of Classification Search
CPC . B42D 2033/26; G03H 1/0011; G03H 25/328

USPC ....................... 349/115, 176; 359/2
See application file for complete search history.

(56) References Cited

U.S. PATENT DOCUMENTS

2007/0037290 A1    2/2007   Hoshino et al.
2007/0097299 A1    5/2007   Watanabe et al.
(Continued)

FOREIGN PATENT DOCUMENTS

DE    10 2004 021 246 A1    11/2005
EP           1 833 034 A1      9/2007
(Continued)

OTHER PUBLICATIONS

Jun. 12, 2012 International Search Report issued in International Patent Application No. PCT/JP2012/055977.
(Continued)

*Primary Examiner* — Thanh-Nhan P Nguyen
(74) *Attorney, Agent, or Firm* — Oliff PLC

(57) ABSTRACT

In an identification medium, switching of images can be clearly observed, and the medium has a structure produced at low cost. The structure comprises a cholesteric liquid crystal layer 102 in which a hologram is formed, and which selectively reflects circularly polarized light of a specific rotating direction of a specific central wavelength, a cholesteric liquid crystal layer reflecting the entire range of visible light 105 which has reflection characteristics equivalent to a case of reflecting the entire range of visible light and which reflects circularly polarized light of the same rotating direction as the circularly polarized light reflected from the cholesteric liquid crystal layer 102, and a display pattern 106 having a specific content displayed, arranged in this order, as seen from the side of observation.

10 Claims, 10 Drawing Sheets

(51) Int. Cl.
  *G09F 3/00* (2006.01)
  *G09F 3/03* (2006.01)
  *G02F 1/1334* (2006.01)
  *B42D 25/29* (2014.01)
  *B42D 25/00* (2014.01)
  *B42D 25/328* (2014.01)
  *B42D 25/391* (2014.01)

(52) U.S. Cl.
  CPC .......... *G02F1/13342* (2013.01); *G09F 3/0294* (2013.01); *G09F 3/0341* (2013.01); *B42D 25/328* (2014.10); *B42D 25/391* (2014.10); *B42D 2035/26* (2013.01)

(56) References Cited

U.S. PATENT DOCUMENTS

| | | | | |
|---|---|---|---|---|
| 2007/0159671 | A1* | 7/2007 | Hoshino | G02B 5/3016 359/2 |
| 2007/0216518 | A1 | 9/2007 | Hoffmuller | |
| 2008/0138543 | A1 | 6/2008 | Hoshino et al. | |
| 2010/0302486 | A1* | 12/2010 | Hoshino | G03H 1/0011 349/115 |
| 2011/0317114 | A1* | 12/2011 | Kim | G02B 5/3083 349/117 |

FOREIGN PATENT DOCUMENTS

| | | |
|---|---|---|
| JP | A-2000-255200 | 9/2000 |
| JP | A 2004-338257 | 12/2004 |
| JP | A 2005-134490 | 5/2005 |
| JP | A 2007-069486 | 3/2007 |
| JP | A 2009-172798 | 8/2009 |
| JP | A 2009-216722 | 9/2009 |
| JP | B2 4392826 | 1/2010 |
| JP | A-2010-117381 | 5/2010 |

OTHER PUBLICATIONS

Aug. 28, 2014 Search Report issued in European Patent Application No. 12760512.9.

* cited by examiner

One example of display pattern 1 0 6

Hologram based on hologram formation 1 0 3

One example of display pattern 1 0 6

Hologram based on hologram formation 1 0 3

IDENTIFICATION MEDIUM

TECHNICAL FIELD

The present invention relates to an identification medium in which clear switching of content can be observed.

BACKGROUND ART

Japanese Patent Publication No. 4392826 discloses a structure in which is layered a primary cholesteric liquid crystal layer that selectively reflects right circularly polarized light and has a hologram formed therein, and a secondary cholesteric liquid crystal layer that selectively reflects left circularly polarized light and has a hologram formed therein, thereby enabling observation of switching between the two holograms in selective observation using right and left circularly polarized light filters.

Japanese Unexamined Patent Application Publication No. 2009-172798 discloses a combination of a cholesteric liquid crystal layer having a hologram formed therein and a printed layer, thereby enabling observation of switching between the hologram image and the printed image in observation using a circularly polarized light filter.

SUMMARY OF THE INVENTION

In the technique disclosed in the 4392826 publication, although observation of switching between hologram images is possible, production cost may be higher because a hologram must be formed in each of the two cholesteric liquid crystal layers. In the technique disclosed in the 2009-172798 publication, in the observation using the circularly polarized light filter transmitting reflected light from the cholesteric liquid crystal layer, there is a problem in clear switching of images since the printed layer of the background is viewed simultaneously with the hologram.

In view of such circumstances, an object of the present invention is to provide an identification medium in which clear switching of images can be observed using a low cost structure.

In a first aspect of the invention, an identification medium has a structure, the structure comprising, arranged in the following order as seen from the observation side: a primary cholesteric liquid crystal layer in which a hologram is formed, and which selectively reflects circularly polarized light of a specific rotating direction with a specific central wavelength, a secondary cholesteric liquid crystal layer which has the reflection characteristic of reflecting the entire range of visible light or a reflection characteristic equivalent to the case of reflecting the entire range of visible light, and which reflects circularly polarized light of the same rotating direction as the circularly polarized light reflected from the primary cholesteric liquid crystal layer, and a display pattern having specific content displayed.

According to the first aspect of the invention, by using the nature of the secondary cholesteric liquid crystal layer which has a specific rotation and which selectively transmits a circularly polarized light equivalent to a case of having a wavelength distribution of the entire range of visible light, in an observation via a circularly polarized light filter blocking a selective reflected light from the primary cholesteric liquid crystal layer, display content of the display pattern can be clearly observed without being interfered with by the hologram of the primary cholesteric liquid crystal layer. At this time, a light which is reflected by the display pattern, which cannot be transmitted to the secondary cholesteric liquid crystal layer, and which is reflected on the lower surface of the layer in the direction of the display pattern again, becomes a polarized light transmittable through the secondary cholesteric liquid crystal layer by repeated reflection, and then exits from the identification medium as a light to identify the display pattern. Therefore, visibility is improved when selectively viewing the display pattern over the circularly polarized light filter.

In a second aspect of the invention according to the first aspect of the invention, in the identification medium, a light transmissive layer having refraction index anisotropy is arranged between the secondary cholesteric liquid crystal layer and the display pattern.

In a third aspect of the invention, an identification medium has a primary cholesteric liquid crystal layer in which a hologram is formed, and which selectively reflects circularly polarized light in a specific rotating direction of a specific central wavelength, a secondary cholesteric liquid crystal layer which has a reflection characteristic of reflecting the entire range of visible light or reflection characteristics equivalent to a case of reflecting the entire range of visible light, and which reflects circularly polarized light of the same rotating direction as the circularly polarized light reflected from the primary cholesteric liquid crystal layer, and an adhesive layer having light transmissive characteristics, arranged in this order seen from the side of observation.

According to the third aspect of the invention, since the adhesive layer has the light transmissive characteristics (characteristics of transmitting visible light), in a condition in which the medium is adhered to an object, a similar optical function as in the first aspect of the invention can be obtained using a display on the surface of the object.

In a fourth aspect of the invention according to one of the first to third aspects of the invention, the identification medium further has a cycloolefin polymer layer between the primary cholesteric liquid crystal layer and the secondary cholesteric liquid crystal layer.

The cycloolefin polymer is inexpensive, has chemical properties that are easily degraded to an extreme degree when in contact with a hydrocarbon type solvent such as gasoline, kerosene, paint thinner, and benzine, and has physical characteristics that are easily degraded, or it may become wrinkled when a dragging force is applied when it is in contact with a solvent. Therefore, by employing the third aspect of the invention, the identification medium can have a structure in which a layered structure of the medium will be broken and the medium cannot then be used again, in a case in which the identification medium is attempted to be dragged improperly or to be forcibly dragged off of the object. This property is advantageous from the viewpoint of preventing and complicating improper reuse of the identification medium 100.

A cycloolefin polymer has the above-mentioned advantages, and in addition, it has physical characteristics such that wrinkles or cracks may form due to physical contact from outside (for example, by being touched by a hand). If this phenomenon occurs, there may be a problem in that the phenomenon becomes optically visible. According to the fourth aspect of the invention, since the medium has a structure in which the cycloolefin polymer layer is sandwiched between the cholesteric liquid crystal layer and the cholesteric liquid crystal layer reflecting the entire range of visible light from the two sides, the cycloolefin polymer layer is prevented from being contacted from outside during an adhering operation or the like, and as a result, the abovementioned problem of wrinkling and cracking does not occur.

In the present invention, an identification medium can be obtained having a low-cost structure and in which switching of images can be clearly observed.

EXPLANATION OF REFERENCE NUMERALS

100: Identification medium, 101: Protection layer, 102: Cholesteric liquid crystal layer, 103: Hologram, 104: COP (cycloolefin polymer) layer, 105: Cholesteric liquid crystal layer reflecting the entire range of visible light, 105a: Cholesteric liquid crystal layer, 105b: Cholesteric liquid crystal layer, 105c: Cholesteric liquid crystal layer, 106: Display pattern, 107: Adhesive layer, 108: Separator, 109: Objective material, 110: Birefringent layer, 200: Identification medium, 300: Identification medium, 301: Optically anisotropic layer, 400: Identification medium, 500: Identification medium.

BEST MODE FOR CARRYING OUT THE INVENTION (1) First Embodiment
(Structure)

Figure 1A:
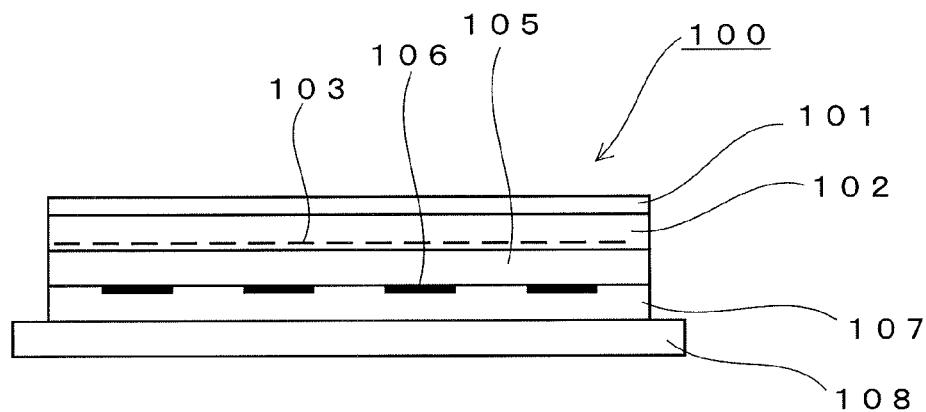
FIG. 1 is a cross-sectional view of an embodiment.

FIG. 1A shows an identification medium 100 of the embodiment. The identification medium 100 has a structure in which a protection layer 101, a cholesteric liquid crystal layer 102, a cholesteric liquid crystal layer reflecting the entire range of visible light 105, a display pattern 106, an adhesive layer 107, and a separator 108 are layered seen from a side of observation. The protection layer 101 is to protect the observation surface, has light transmissive characteristics for visible light, and is a thin membrane of material that does not disturb polarized light conditions of transmitted light. As a material to form the protection layer 101, triacetylcellulose, acrylic resin, cycloolefin or the like can be mentioned. In particular, since cycloolefin has inferior oil resistance, in the case in which cycloolefin is used as the protection layer 101, when solvent, oil or the like is applied on the identification medium 100 after it has been adhered to an object, in order to attempt to separate the medium from the object, the protection layer 101 will be destroyed. In this way, it has an advantage in that reuse of the identification medium 100 by improper separation can be prevented.

The cholesteric liquid crystal layer 102 is set so as to selectively reflect red circularly polarized light of the right rotating direction, and a hologram 103 is formed by pressing an emboss mold against the surface opposite to the observation side (lower surface in the case of FIG. 1). In the case in which reflected light from the cholesteric liquid crystal layer 102 is observed, a hologram image based on this hologram formation 103 can be observed. A rotating direction of the circularly polarized light which is selectively reflected by the cholesteric liquid crystal layer 102 can be the left rotating direction. However, the rotating direction must be the same rotating direction as that of the circularly polarized light that is selectively reflected by the cholesteric liquid crystal layer reflecting the entire range of visible light 105 mentioned below. In addition, regarding the central wavelength selectively reflected by the cholesteric liquid crystal layer 102, green or another color can be selected based on the purpose of use and visibility function.

The cholesteric liquid crystal layer selecting the entire range of visible light 105 selectively reflects right circularly polarized light and has optical characteristics in which the selectively reflected circularly polarized light can be observed as light of the entire range of visible light in a condition in which natural light shines on the layer. That is, it has a property of reflecting all the wavelengths of the incident visible light range, or reflecting characteristics equivalent to a case of reflecting all the wavelengths of the incident visible light range, not reflecting selectively a specific wavelength range. Although it is called "the entire range of visible light" as a matter of convenience, it should be noted that the present invention is not limited to a case including substantially all the components of the visible light range; the invention includes a case of reflection characteristics having a wavelength spectrum that can be seen as light including the entire range of visible light by human observation based on a combination of multiple wavelength peaks therein.

In the case in which the cholesteric liquid crystal layer 102 is set to selectively reflect a left circularly polarized light, the cholesteric liquid crystal layer reflecting the entire range of visible light 105 is also set to selectively reflect a left circularly polarized light. That is, the rotating direction of the circularly polarized light reflected by the cholesteric liquid crystal layer reflecting the entire range of visible light 105 must be set to be the same as the rotating direction of the circularly polarized light selectively reflected by the cholesteric liquid crystal layer 102.

Hereinafter, the cholesteric liquid crystal layer reflecting the entire range of visible light 105 is explained in detail. First, in an ordinary cholesteric liquid crystal layer, a circularly polarized light having a specific rotating direction and a specific central wavelength such as red or green is selectively reflected. On the other hand, a circularly polarized light having opposite rotating direction, a linear polarized light, and a circularly polarized light having the same specific rotating direction mentioned above and having a wavelength component different from the central wavelength mentioned above, are transmitted, and are not reflected. The reason for this is that the wavelength of light selectively reflected is determined by size of pitch of the cholesteric liquid crystal layer. On the other hand, the cholesteric liquid crystal layer reflecting the entire range of visible light 105 selectively reflects a circularly polarized light of the entire range of visible light (alternatively, wavelength spectrum which can be regarded as the entire range) of a specific rotating direction. Of course, a linear polarized light and a circularly polarized light of the opposite rotating direction are transmitted. This optical property can be obtained by combining multiple cholesteric liquid crystal layers having different pitch. For example, Japanese Patent Application No. 3373374 discloses about a cholesteric liquid crystal of visible light of the entire range.

Figure 2:
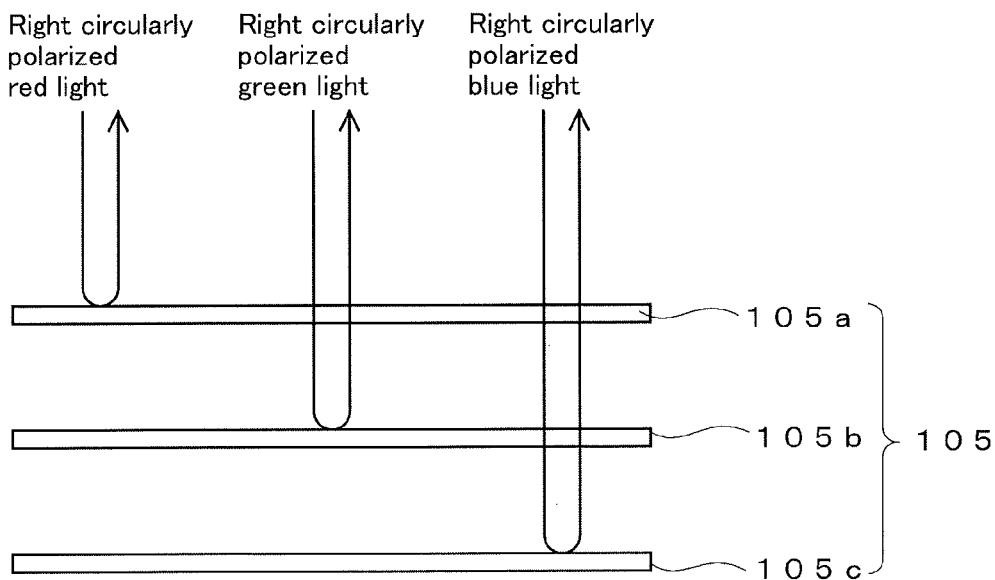
FIG. 2 is a conceptual view showing a cross-sectional structure of the cholesteric liquid crystal layer reflecting the entire range of visible light in an embodiment.

Hereinafter, one example of the cholesteric liquid crystal layer reflecting the entire range of visible light 105 is explained. FIG. 2 conceptually shows a cross sectional structure of the cholesteric liquid crystal layer reflecting the entire range of visible light 105. In FIG. 2, the cholesteric liquid crystal layer reflecting the entire range of visible light 105 consists of three layers of a primary cholesteric liquid crystal layer 105*a*, a secondary cholesteric liquid crystal layer 105*b*, and a tertiary cholesteric liquid crystal layer 105*c*. FIG. 2 shows these three layers separated; however, they are stacked (layered) and unified in practice.

Here, the cholesteric liquid crystal layer 105*a* is set to selectively reflect a right circularly polarized red light (wavelength 650±50 nm), the cholesteric liquid crystal layer 105*b* is set to selectively reflect a right circularly polarized green light (wavelength 550±50 nm), and the cholesteric liquid crystal layer 105*c* is set to selectively reflect a right circularly polarized blue light (wavelength 450±50 nm).

It is assumed that natural light comes from the upper direction of FIG. 2 against the cholesteric liquid crystal layer reflecting the entire range of visible light 105 having the three-layer structure. In this case, the right circularly polarized red light is selectively reflected from the primary cholesteric liquid crystal layer 105*a*, the right circularly polarized green light is selectively reflected from the secondary cholesteric liquid crystal layer 105*b*, and the right circularly polarized blue light is selectively reflected from the tertiary cholesteric liquid crystal layer 105*c*. At this time, since the primary cholesteric liquid crystal layer 105*a* permits transmission of the green and blue wavelength components regardless of the condition of the polarized light, and the secondary cholesteric liquid crystal layer 105*b* permits transmission of the blue wavelength component regardless the condition of polarized light, as shown in FIG. 2, the right circularly polarized red light, green light, and blue light are reflected from the cholesteric liquid crystal layer reflecting the entire range of visible light 105 to the upper direction of FIG. 2. If the red, green, blue lights are observed at the same time, the human eye perceives it as a condition equivalent to a case of the entire range of visible light being seen. That is, the optical property equivalent to a case in which a circularly polarized light having a specific rotation (right circularly polarized light in FIG. 2) of the entire range of visible light is selectively reflected can be obtained. In this case, in an observation by the naked eye, white, mirror surface, metallic sheen, or whitish silver (whitish metallic sheen) is observed. Differences in appearance thereof are due to differences in planar properties on a reflection surface. For example, white light is observed in a case in which the reflection surface is rough, light as if it were reflected from a mirror is observed in a case in which it is very planar, and a metallic sheen or a whitish silver is observed in a case in which the planarity of the reflection surface corresponds a degree not that of a mirror surface.

As the cholesteric liquid crystal layer reflecting the entire range of visible light 105, in addition to the layered type shown in FIG. 2, a structure can be employed, in which three kinds of cholesteric liquid crystals, each having a characteristic of reflecting circularly polarized light of the same rotating direction of red, green, and blue are formed into a stripe pattern, a grid pattern, or a dot pattern having a width of about 50 μm. Furthermore, as the cholesteric liquid crystal layer reflecting the entire range of visible light 105, a structure can be used in which pitch of cholesteric liquid crystals is continuously varied as a gradient so as to give a property adjusted to reflect a circularly polarized light of wavelength range having a certain width.

In addition, by a combination of colors of two or colors of not less than four, not by the RGB, it is possible to produce an effect as if light of the entire range of visible light were reflected when seen by the human eye. Of course, it is possible to obtain a property in which the entire range of visible light is substantially reflected by enabling obtaining reflecting light of wavelength spectrum evenly covering the entire range of visible light. It should be noted that thickness of the cholesteric liquid crystal layer reflecting the entire range of visible light 105 should be in a range from 0.5 μm to 10 μm, and desirably from 1 μm to 5 μm.

As shown in FIG. 1, a display pattern 106 is formed by printing on the lower surface (the opposite side to the observation surface) of the cholesteric liquid crystal layer reflecting the entire range of visible light 105. In this example, the display pattern 106 is formed by the inkjet method. The content of the display pattern 106 can be characters, kinds of pictures, codes or the like. As the code, display content constructed by at least one selected from a barcode, two-dimensional code, OCR code, hologram code, and color code can be used. Furthermore, the printing method is not limited to the inkjet method, and another printing method such as offset printing method can be used. Furthermore, the display pattern 106 can be formed by a method in which the display pattern 106 is arranged on a base material film such as resin film and is then transferred to the cholesteric liquid crystal layer reflecting the entire range of visible light 105. Furthermore, the display pattern 106 can be constructed by a hologram.

An adhesive layer 107 is arranged adjacent to the display pattern 106. The adhesive layer 107 is a layer of adhesive, and it is used when the identification medium 100 is attached on an object. On the back surface of the adhesive layer 107, a separator 108 is attached as a releasing paper. When the identification medium 100 is attached on the object, the separator 108 is removed from the adhesive layer 107 first, and then the adhesive layer 107 is contacted to the object. By the adhesive force of the adhesive agent 107, the identification medium 100 is fixed to the object. It should be noted that colors of the display pattern 106 and the adhesive layer 107 are selected to be seen as different colors. The reason for this is to facilitate identification of the image of the display pattern 106.

Figure 1B:
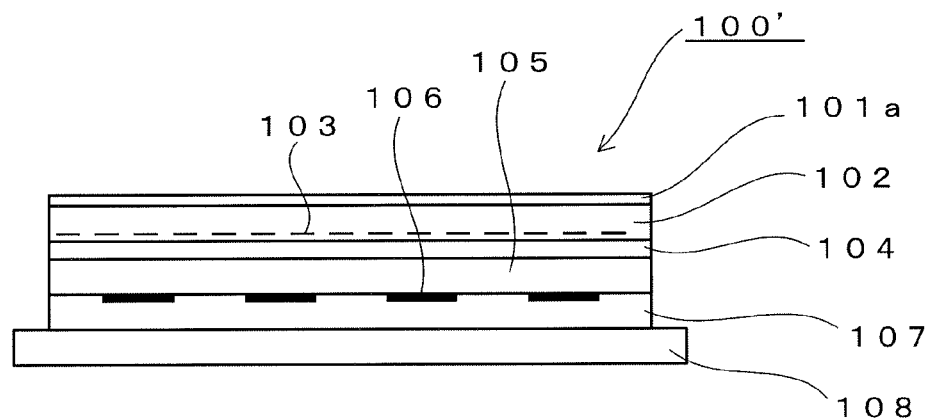

In FIG. 1B, an identification medium 100', which is a variation of the identification medium 100, is shown. The identification medium 100' has a structure in which a hard coat layer 101*a* functioning as a protection layer, the cholesteric liquid crystal layer 102, the COP (cycloolefin polymer) layer 104, the cholesteric liquid crystal layer reflecting the entire range of visible light 105, the display pattern 106, the adhesive layer 107, and the separator 108 are stacked seen from the side of observation. The hard coat layer 101*a* is a coat layer formed by acryl resin, urethane resin or the like and is a resin layer to protect the observation surface side of the cholesteric liquid crystal layer 102. As the hard coat layer 101*a*, a material having light transmissive characteristics for visible light and not disturbing polarized light conditions of transmitted light is selected.

The COP layer 104 is formed by a film shape material of cycloolefin polymer, and it functions as a base material of the cholesteric liquid crystal layer 102 and the cholesteric liquid crystal layer reflecting the entire range of visible light 105. The film of cycloolefin polymer forming the COP layer 104 has light transmissive characteristics for visible light and characteristics not disturbing polarized light conditions of transmitted light.

(Optical Function: Observation Over Left Circularly Polarized Light Filter)

Figure 3:
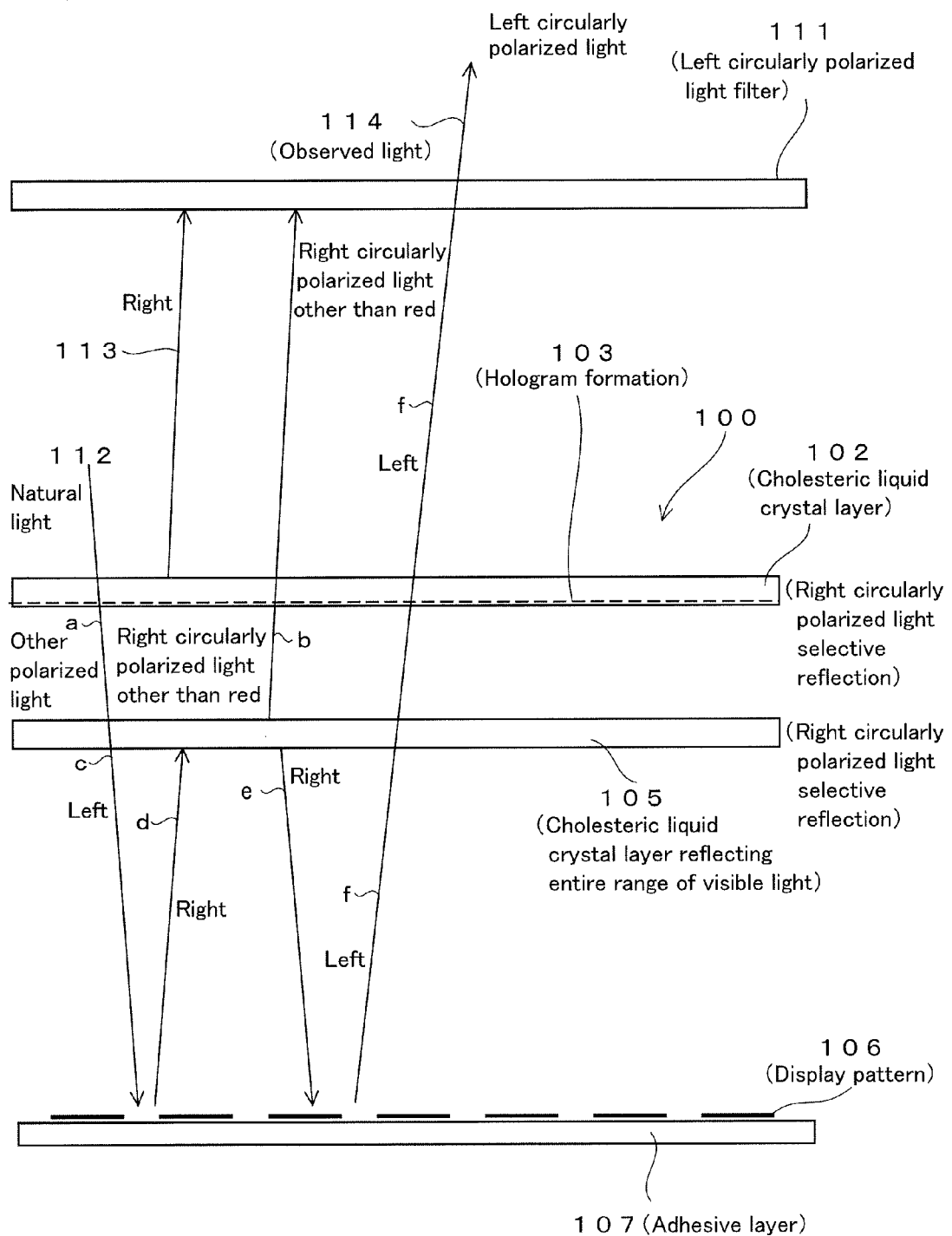
FIG. 3 is a principle view explaining optical function of an embodiment.

FIG. 3 conceptually shows a condition in which the identification medium 100 is observed over the left circularly polarized light filter 111. It should be noted that "right" means the right circularly polarized light, "left" means the left circularly polarized light, and "other polarized light" means a polarized light component of a specific central wavelength except for the right circularly polarized light in FIG. 3.

Here, it is assumed that natural light enters into the identification medium 100. In this case, the cholesteric liquid crystal layer 102 selectively reflects right circularly polarized red light 113. This right circularly polarized red light 113 selectively reflected is blocked by the left circularly polarized light filter 111, and is not able to reach the observation side. Furthermore, among the natural light entered into the cholesteric liquid crystal layer 102, right circularly polarized light other than red and mainly left circularly polarized light transmit through the cholesteric liquid crystal layer 102 from an upper direction of the figure to a lower direction. This transmitted light is shown by reference character a as other polarized light.

The other polarized light a enters into the cholesteric liquid crystal layer reflecting the entire range of visible light 105, and then, right circularly polarized light of reference character b is reflected to an upper direction of the figure. This right circularly polarized light b is a right circularly polarized light other than red, is blocked by the left circularly polarized light filter 111, and is not able to reach the observation side. Furthermore, mainly left circularly polarized light (reference character c) included in the other polarized light a transmits through the cholesteric liquid crystal layer reflecting the entire range of visible light 105, reaches the display pattern 106, and is reflected thereon. At this time, the rotating direction is reversed, and it is reflected as right circularly polarized light d. This right circularly polarized light d is reflected on the lower surface of the cholesteric liquid crystal layer reflecting the entire range of visible light 105 to a lower direction of the figure, and again enters into the display pattern 106 as right circularly polarized light e. The right circularly polarized light e is reflected as left circularly polarized light f since rotation direction is reversed when reflected on the display pattern 106. The left circularly polarized light f transmits through the cholesteric liquid crystal layer reflecting the entire range of visible light 105 and the cholesteric liquid crystal layer 102, enters into the left circularly polarized light filter 111, transmits therethrough, and reaches the observer's side as observed light 114.

In this way, in the case in which the identification medium 100 is observed over the left circularly polarized light filter, reflected light from the cholesteric liquid crystal layer 102 cannot be observed. That is, a hologram caused by the hologram formation 103 cannot be observed. On the other hand, since reflected light from the display pattern 106 can be observed, the image of the display pattern 106 can be visible. The same result can be obtained in a case in which image identification means by a camera is used. That is, in the image identification by camera, in a case in which an image is photographed over the left circularly polarized light filter 111, the hologram caused by the hologram formation 103 cannot be obtained as an image, and the display content of the display pattern 106 is electrically obtained as an image.

In addition, also in a case in which polarized light condition is disturbed during reflection of light at the display pattern 106, the polarized light component that can transmit through the cholesteric liquid crystal layer reflecting the entire range of visible light 105 is generated. This light transmits through the cholesteric liquid crystal layer 102 and the left circularly polarized light filter 111, and is seen by the observer. Since this light has image content that is the same as the observed light 114, it contributes to increase light amount of the observed light 114.

(Optical Function: Observation Over Right Circularly Polarized Light Filter)

Figure 4:
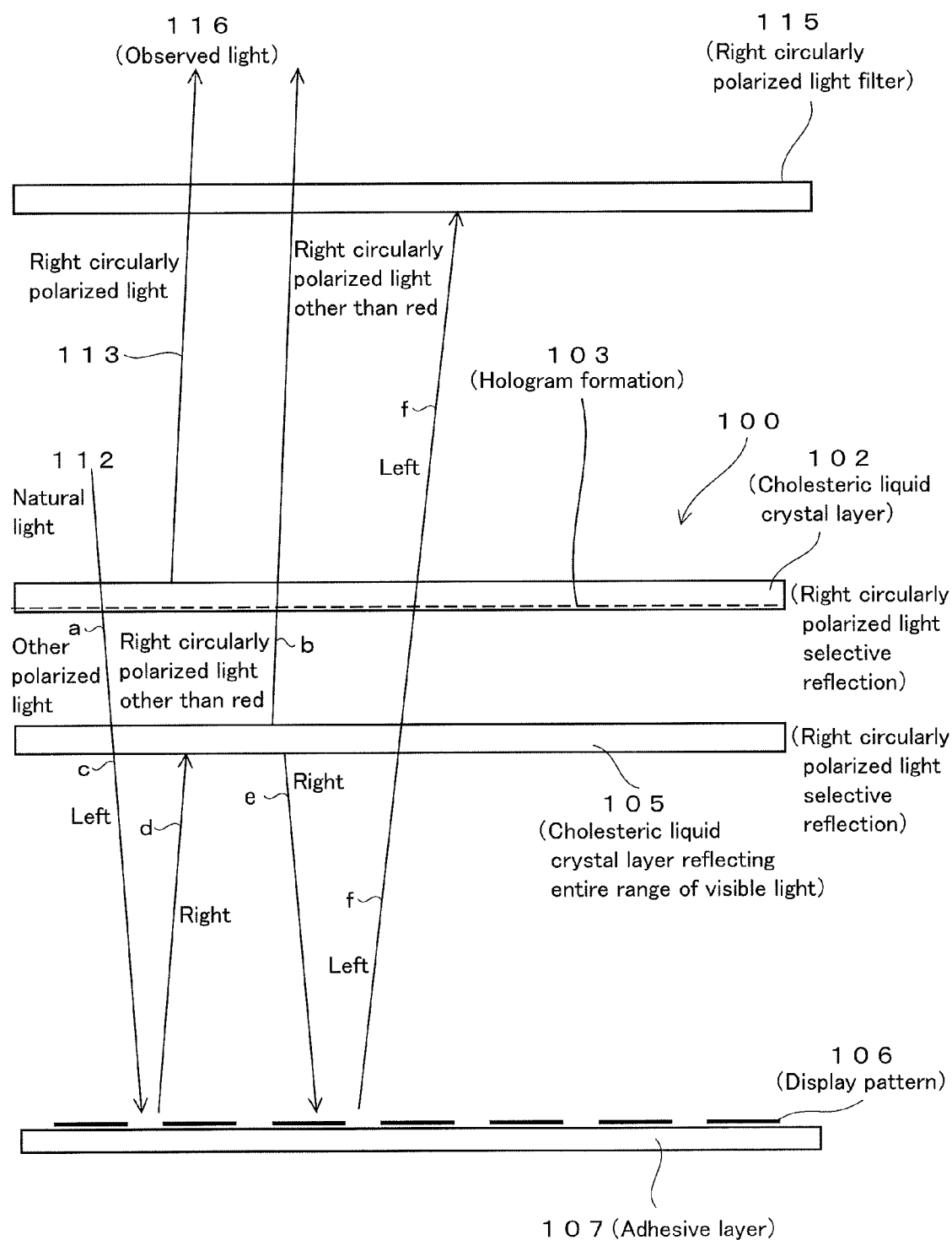
FIG. 4 is a principle view explaining optical function of an embodiment.

FIG. 4 shows a condition in which the identification medium 100 is observed over the right circularly polarized light filter 115. In FIG. 4, behavior of light in the identification medium 100 is the same as in the case of FIG. 3. In this case, right circularly polarized red light 113 selectively reflected from the cholesteric liquid crystal layer 102 transmits through the right circularly polarized light filter 115, and is observed by an observer as observed light 116. Therefore, a hologram image caused by the hologram formation 103 can be observed over the right circularly polarized light filter 115.

Furthermore, light mainly containing left circularly polarized light which is reflected from the display pattern 106 and transmitted through the cholesteric liquid crystal layer 102 to an upper direction in the figure, cannot be observed since it is blocked by the right circularly polarized light filter 115. That is, the display pattern 106 cannot be seen in the case in which the identification medium 100 is seen over the right circularly polarized light filter 115. In this way, the display pattern 106 cannot be seen in the case in which the identification medium 100 is seen over the right circularly polarized light filter 115, but on the other hand, the hologram based on the hologram formation 103 formed on the cholesteric liquid crystal layer 102 can be clearly seen.

As is explained above, only the display pattern 106 can be seen in the case in which the identification medium 100 is observed over the left circularly polarized light filter of FIG. 3. In this case, reflection is repeated on the lower surface side of the cholesteric liquid crystal layer reflecting the entire range of visible light 105, thus reflecting light that increases intensity of the observed light 114 is generated. By this phenomenon, brightness of the display pattern 106 is increased.

Furthermore, as shown in FIG. 4, the hologram caused by the hologram formation 103 of the cholesteric liquid crystal layer 102 is selectively seen and the display pattern 106 cannot be seen in the case in which the identification medium 100 is observed over the right circularly polarized light filter 115.

It should be noted that the hologram of the cholesteric liquid crystal layer 102 and the display pattern 106 can be seen at the same time since all of the polarized light components reflected can be seen at the same time in a case in which the identification medium 100 is directly seen.

As explained, by performing observation by switching left and right circularly polarized light filters, the display pattern and the hologram can be observed to switch. This switching is clear. Furthermore, a total of three kinds of pattern can be seen by including the case of direct viewing.

FIG. 5 is a conceptual diagram showing one example of how the identification medium 100 is seen in a case in which it is observed with switching the abovementioned circularly polarized light filters. In FIG. 5, "GENUINE" is a printed pattern of the display pattern 106, and "Security" is a hologram image caused by the hologram formation 103.

Figure 5A:
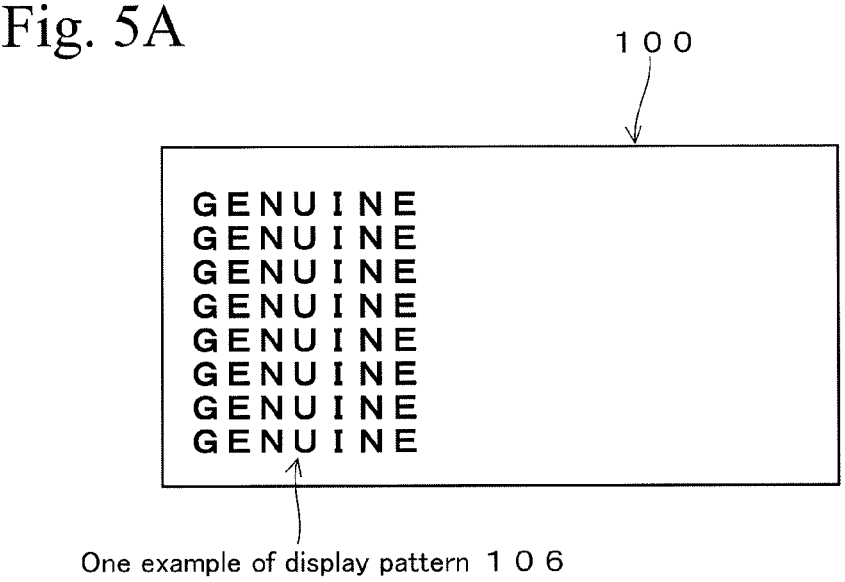
FIG. 5 is a conceptual view showing how an embodiment appears.

FIG. 5A shows a content of an image observed in a case in which the identification medium 100 is observed over the left circularly polarized light filter 111 shown in FIG. 3. In this case, as explained with reference to FIG. 3, the display pattern 106 "GENUINE" is selectively observed clearly. At this time, the hologram "Security" caused by the hologram formation 103 of the cholesteric liquid crystal layer 102 cannot be seen.

Figure 5B:
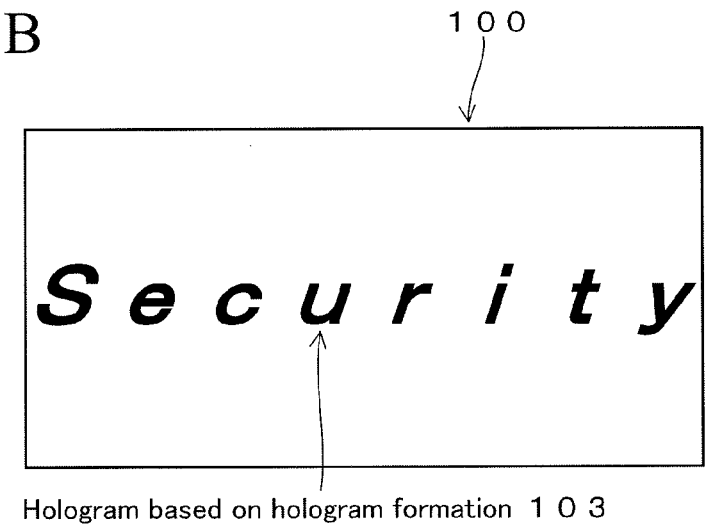

FIG. 5B shows a content of an image observed in a case in which the identification medium 100 is observed over the right circularly polarized light filter 115 shown in FIG. 4. In this case, as explained with reference to FIG. 4, the hologram "Security" caused by the hologram formation 103 is selectively observed. At this time, the display pattern 106 "GENUINE" cannot be seen.

Figure 5C:
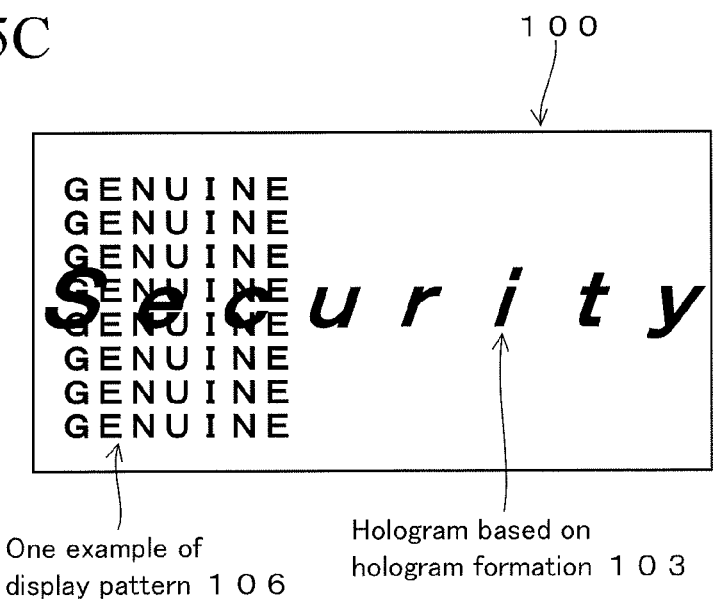

FIG. 5C shows a content of an image in a case observed directly. In this case, the hologram "Security" caused by the hologram formation 103 and the display pattern 106 "GENUINE" are observed at the same time.

The same observed content can be obtained also in a case in which the image identification means is a camera that is being used. That is, in a case in which a photograph is taken over the left circularly polarized light filter 111 in the image identification by using camera, the hologram "Security" caused by the hologram formation 103 cannot be obtained as an image, and the display pattern 106 "GENUINE" is electrically obtained as an image. Furthermore, in a case in which a photograph is taken over the right circularly polarized light filter 115, the hologram "Security" caused by the hologram formation 103 is obtained as an image, and the display pattern 106 "GENUINE" cannot be obtained as an image. Furthermore, in a case in which a photograph is taken by camera without using the circularly polarized light filter, image information in which the hologram "Security" and the display pattern 106 "GENUINE" are overlapped is obtained.

The observed content explained so far is obtained both in a case in which the circularly polarized light filters 111 and 114 are apart from the identification medium and in a case in which they are contacted with the medium. Furthermore, the color shift effect in which color shifts to a shorter wavelength side by varying observation angle in the cholesteric liquid crystal, and also in the identification medium 100 and 100', the color shift can be observed by varying observation angle (for example, by inclining the identification medium). Furthermore, optical function of the identification medium 100' of FIG. 1B is the same as the case of the identification medium 100 of FIG. 1A, and contents observed in both cases are also the same as long as their structures, except for the COP layer 104, are the same.

(Method for Production)

Hereinafter, one example of a process to produce the identification medium 100 of FIG. 1A is explained. First, the protection layer 101 is formed on a base material film, which is not shown, and the cholesteric liquid crystal layer 102 is grown further thereon. Then, a mold is pressed to a surface exposed of the cholesteric liquid crystal layer 102 so as to perform hologram formation 103.

On the other hand, on each of other base material films, not shown, the primary cholesteric liquid crystal layer 105a, the secondary cholesteric liquid crystal layer 105b, and the tertiary cholesteric liquid crystal layer 105c which form the cholesteric liquid crystal layer reflecting the entire range of visible light 105 shown in FIG. 2, are formed separately. The primary cholesteric liquid crystal layer 105a, the secondary cholesteric liquid crystal layer 105b, and the tertiary cholesteric liquid crystal layer 105c formed separately are layered on an exposed surface of the cholesteric liquid crystal layer 102, and fixed by an adhesive. Next, the display pattern 106 is formed on a back surface side of the exposed side of the cholesteric liquid crystal layer reflecting the entire range of visible light 105, by an inkjet method or the like. Next, the adhesive layer 107 is arranged on the exposed surface of the cholesteric liquid crystal layer reflecting the entire range of visible light 105, and the separator 108 is attached on the exposed surface of the adhesive layer 107, so as to obtain the medium 100 shown in FIG. 1A.

In order to produce the identification medium 100' of FIG. 1B, first, the hard coat layer 101a is formed on a resin film such as a PET film, which is not shown, and the cholesteric liquid crystal layer 102 is formed further thereon, and the hologram formation 103 is performed there. This is transferred to the COP layer 104, and the layered structure of the COP layer 104 and the cholesteric liquid crystal layer 102 is obtained by releasing the resin film, which is not shown. On the other hand, the cholesteric liquid crystal layer reflecting the entire range of visible light 105 is obtained by the method mentioned above, and it is adhered on an exposed surface of the COP layer 104. In this way, the layered structure in which the cholesteric liquid crystal layer 102, the COP layer 104, the cholesteric liquid crystal layer reflecting the entire range of visible light 105 are layered seen from the observation side, is obtained. Finally, the identification medium 100' is produced via a process similar to that of the identification medium 100.

(Priority)

The function mentioned above can be almost realized by using a circularly polarized light filter in which linear polarized light plate and $\lambda/4$ plate are combined in addition to the cholesteric liquid crystal layer reflecting the entire range of visible light. However, in the case in which the circularly polarized light filter is used, observation conditions of the display pattern 106 become dark since about 50% of light of the light reflected on the printed surface is absorbed in the linear polarized light plate. On the other hand, in the structure of the present invention, since a member corresponding to the above linear polarized light plate absorbing light is not used and since a light component contributing to the observed light is generated during the repeated reflection process at the back side of the cholesteric liquid crystal layer reflecting the entire range of visible light, the amount of reflecting light from the display pattern 106 can be increased. In other words, since the reflecting light from the display pattern 106 can be efficiently obtained outside of the identification medium 100, the amount of reflecting light from the display pattern 106 can be increased more. Therefore, compared to the case in which the above circularly polarized light filter is used, the display pattern 106 can be brighter and be seen more clearly.

For example, in a case in which the circularly polarized light filter is used instead of the cholesteric liquid crystal layer reflecting the entire range of visible light, light from an upper direction is absorbed 50% in the linear polarized light plate first. Furthermore, if linear polarized light is disturbed by reflection at the display pattern, the disturbed component is further absorbed. Therefore, compared to the case in which the cholesteric liquid crystal layer reflecting the entire range of visible light is used, amount of reflecting light from the display pattern contributing to vision is low, and therefore the display pattern appears dimly.

In addition, the identification medium 100' having the structure in FIG. 1B has a characteristic that improper use is difficult. That is, a cycloolefin polymer constructing the COP layer 104 has chemical properties that are easily extremely deteriorated when in contact with a hydrocarbon type solvent such as gasoline, kerosene, paint thinner, and benzine, and has physical characteristics of being easily broken or wrinkled when a dragging force is applied when in contact with the solvent. Therefore, by employing a structure in which the COP layer is sandwiched between the cholesteric liquid crystal layer 102 and the cholesteric liquid crystal layer reflecting the entire range of visible light 105, a layered structure of the identification medium 100 is broken and the medium cannot be used again if the identification medium 100 is attempted to be dragged improperly using solvent or to be dragged forcibly off of an object. This property is advantageous from the viewpoints of preventing improper reuse and complicating improper reuse of the identification medium 100.

In addition, although a cycloolefin polymer constructing the COP layer 104 is inexpensive, it has a physical property in which wrinkles or cracking may occur by physical contact from the outside (for example, by touching by a hand). If this phenomenon occurs, there may be a problem in that the phenomenon becomes optically visible. According to the structure of FIG. 1B, since the COP layer 104 is sandwiched between the cholesteric liquid crystal layer 102 and the cholesteric liquid crystal layer reflecting the entire range of visible light 105 from the two sides, the COP layer 104 is prevented from being contacted from outside during an adhering operation or the like, and as a result, the abovementioned problems of wrinkling and cracking do not occur in the COP layer 104.

(Other Matters)

It is possible that the rotating direction of circularly polarized light selectively reflected by the cholesteric liquid crystal layer reflecting the entire range of visible light 105 and rotating direction of circularly polarized light selectively reflected by the cholesteric liquid crystal layer 102 can be set in opposite directions to each other. In this case, rotating direction of the circularly polarized light can be reversed by arranging λ/2 plate between the cholesteric liquid crystal layer 102 and the cholesteric liquid crystal layer reflecting the entire range of visible light 105.

(2) Second Embodiment

Figure 6A:
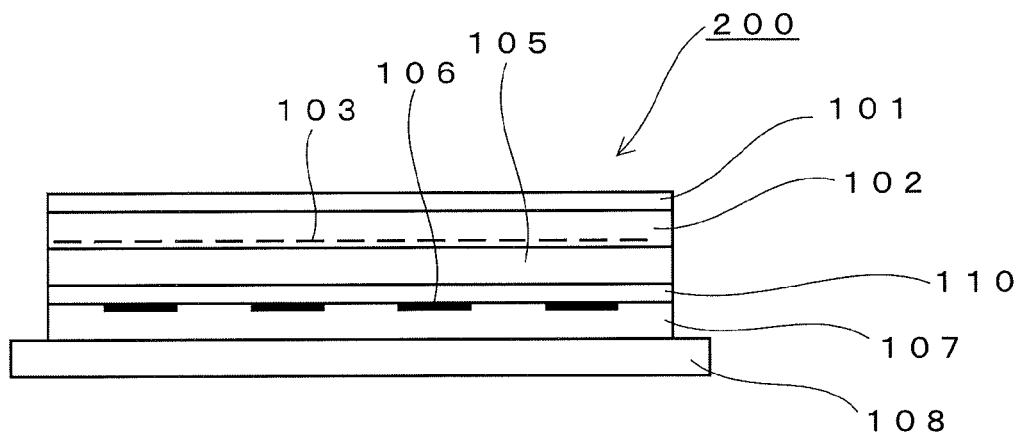
FIG. 6 is a cross-sectional view of the embodiment.
Figure 6B:
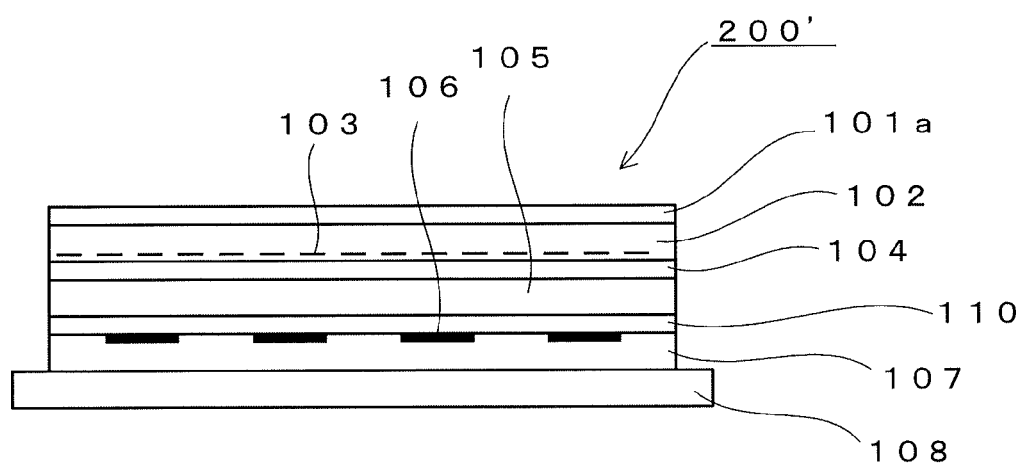

In the structure shown in FIG. 1, a structure in which a birefringent layer is arranged between the cholesteric liquid crystal layer reflecting the entire range of visible light 105 and the display pattern 106, can be employed. FIG. 6A shows identification medium 200. The identification medium 200 has a structure in which the birefringent layer 110 is arranged between the cholesteric liquid crystal layer reflecting the entire range of visible light 105 and the display pattern 106 in the identification medium 100 of FIG. 1. It should be noted that FIG. 6B shows an identification medium 200' having a structure in which the COP layer 104 is sandwiched between the cholesteric liquid crystal layer 102 and the cholesteric liquid crystal layer reflecting the entire range of visible light 105 in the identification medium 200 as a variation. Hereinafter, the identification medium 200 of FIG. 6A is explained since the identification medium 200 and the identification medium 200' are the same except for the COP layer 104.

The birefringent layer 110 is an optical function layer in which the birefringent effect can be obtained, has refraction index anisotropy, and has a property to transmit visible light. In this case, a PET film is employed as the birefringent layer 110. As the birefringent layer 110, kinds of film or liquid crystal or the like exhibiting the birefringent effect can be used. In this example, the display pattern 106 is formed by printing on the birefringent layer 110 of the adhesive layer 107 side.

The birefringent layer 110 disturbs polarized light condition of a light which enters into the cholesteric liquid crystal layer reflecting the entire range of visible light 105 from the observation surface side (upper side of FIG. 1) and transmits through the cholesteric liquid crystal layer reflecting the entire range of visible light 105 (mainly left circularly polarized light component in this case), and a reflecting light from the display pattern 106. That is, by the birefringent effect, the polarized light condition of transmitted light is disturbed. By disturbing the polarized light condition, a light component that can transmit through the cholesteric liquid crystal layer reflecting the entire range of visible light 105 from a lower side to an upper side of FIG. 3 is generated, and amount of reflecting light (observed light) from the display pattern 106 which transmits through the left circularly polarized light filter 111 is increased. This action in which the amount of reflecting light reaching an observer from the display pattern 106 is increased by disturbing the condition of the polarized light is generated during a process in which reflection is repeated between the cholesteric liquid crystal layer reflecting the entire range of visible light 105 and the display pattern 106. Therefore, it is possible for the light reaching the display pattern 106 to be efficiently used, with no waste as reflecting light available for identification.

Figure 7:
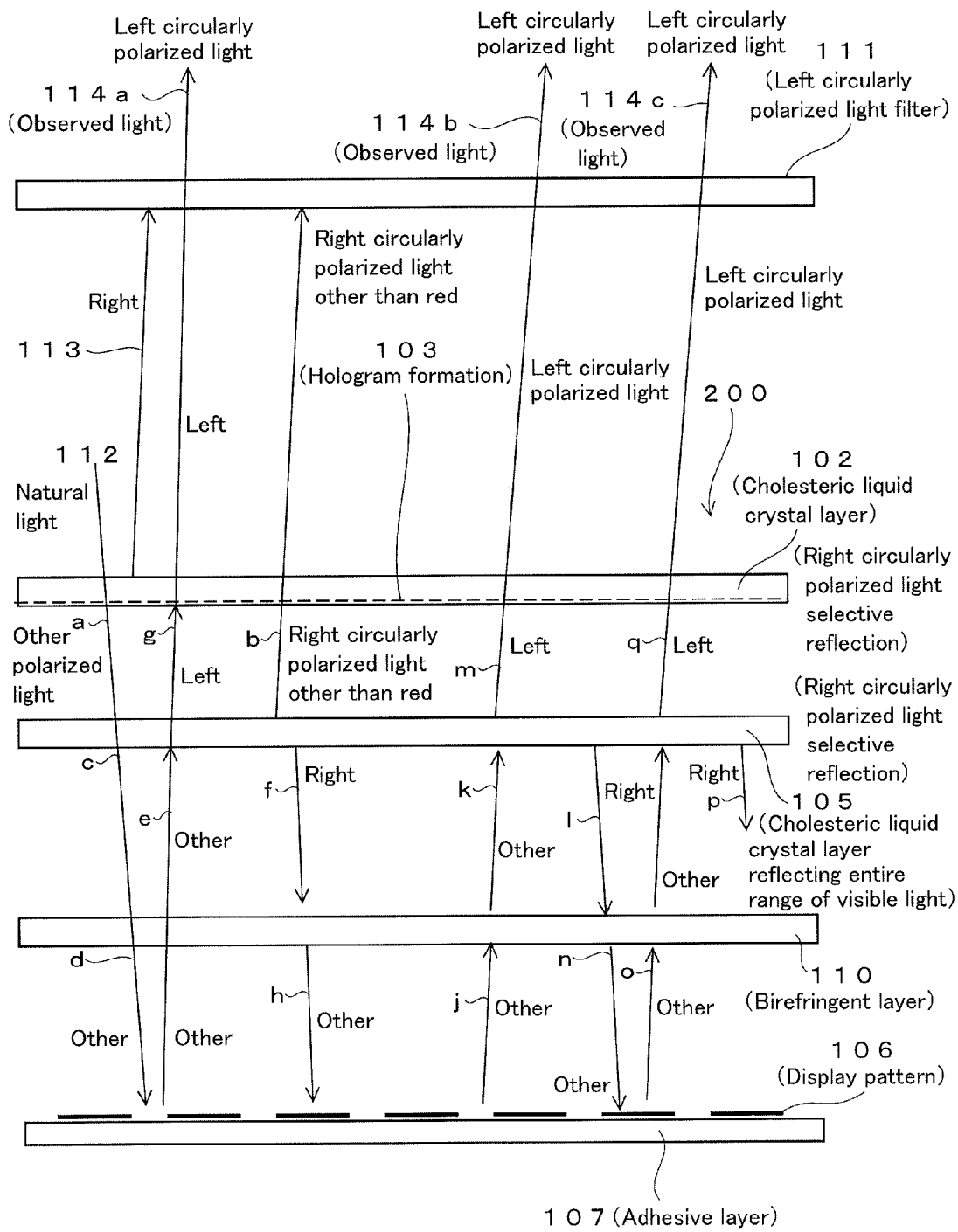
FIG. 7 is a principle view explaining optical function of an embodiment.

Hereinafter, the function of the birefringent layer 110 is explained in practice. It should be noted the content observed is as same as shown in FIG. 5, which is the case of the identification medium 100 of FIG. 1. FIG. 7 conceptually shows a condition in which the identification medium 200 of FIG. 6 is observed over the left circularly polarized light filter 111. It should be noted that "right" means the right circularly polarized light, "left" means the left circularly polarized light, "other polarized light" means a polarized light component of a specific central wavelength except for the right circularly polarized light, and "other" means a light in which polarized light condition is so disturbed that it is not in a specific polarized light condition any longer, in FIG. 7.

Here, it is assumed that natural light enters into the identification medium 200. In this case, the cholesteric liquid crystal layer 102 selectively reflects right circularly polarized red light 113. This right circularly polarized red light 113 selectively reflected is blocked by the left circularly polarized light filter 111, and is not able to reach the observation side. Furthermore, among the natural light entering into the cholesteric liquid crystal layer 102, right circularly polarized light other than red and mainly left circularly polarized light transmit through the cholesteric liquid crystal layer 102 from an upper direction of the figure to a lower direction. This transmitted light is indicated by reference character a as other polarized light.

The other polarized light a enters into the cholesteric liquid crystal layer reflecting the entire range of visible light 105, and then right circularly polarized light of reference character b is reflected to an upper direction of the figure. This right circularly polarized light b is blocked by the left circularly polarized light filter 111, and it is not able to reach the observation side. Furthermore, polarized light other than the right circularly polarized light (reference character c) included in the other polarized light a enters into the birefringent layer 110, and its polarized light condition is disturbed by the birefringent effect. In this way, it becomes light d in which the polarized light condition is disturbed and shown as "other", enters into the display pattern 106, and is reflected thereon. This reflecting light is again transmitted through the birefringent layer 110 from a lower side to an upper side of the figure, is disturbed further in its polarized light condition, and then enters to a lower surface side of the cholesteric liquid crystal layer reflecting the entire range of visible light 105 as light of reference character e.

At this time, light of reference character e has a disturbed polarized light condition, and it includes a left circularly polarized light component, which can transmit through the cholesteric liquid crystal layer reflecting the entire range of visible light 105. The left circularly polarized light component generated by disturbing of this polarized light condition transmits through the cholesteric liquid crystal layer reflecting the entire range of visible light 105 as the left circularly polarized light shown as reference character g. This left circularly polarized light, shown by reference character g also transmits through the cholesteric 102, reaches the left circularly polarized light filter 111, transmits therethrough, and is observed as the observed light 114a.

Furthermore, the right circularly polarized light component in the light of reference character e is reflected at the cholesteric liquid crystal layer reflecting the entire range of visible light 105 and enters into the birefringent layer 110 as the right circularly polarized light f. At this time, in the birefringent layer 110, the right circularly polarized light f is disturbed in its polarized light condition, and is reflected on the display surface 106 as light shown as reference character h. Reflecting light j is generated by this reflection, and the reflecting light j is further disturbed in its polarized light condition during transmitting through the birefringent layer 110, and it enters in a lower surface of the cholesteric liquid crystal layer reflecting the entire range of visible light 105 as light shown by reference character k.

As in the case of light of reference character e, polarized light condition of reference character k is also disturbed, and left circularly polarized light component among them which can transmit through the cholesteric liquid crystal layer reflecting the entire range of visible light 105 transmits through the cholesteric liquid crystal layer reflecting the entire range of visible light 105 to an upper direction of the figure as left circularly polarized light m. On the other hand, right circularly polarized light shown by reference character l included in the reference character k is reflected again to a direction of the display pattern 106.

Left circularly polarized light m transmits through the cholesteric liquid crystal layer 102, further transmits through the left circularly polarized light filter 111, and is observed as the observed light 114b by an observer. The right circularly polarized light l is disturbed in its polarized light condition during transmitting through the birefringent layer 110, part of the components become observed light 114c as left circularly polarized light q via a path similar to reference character f-->h-->j-->k, and right circularly polarized light component generated by disturbing of polarized light is reflected as the right circularly polarized light p again to the side of display pattern 106.

The observed lights 114a, 114b and 114c of left circularly polarized light are reflected light from the display pattern 106, and include image information of the display pattern 106. Furthermore, they are lights that transmit without being reflected nor diffracted at the hologram of the cholesteric liquid crystal layer 102, and do not include image information of a hologram caused by the hologram formation 103. Therefore, the display pattern 106 is clearly seen and the hologram of the cholesteric liquid crystal layer 102 is not seen. Furthermore, by joining the observed lights 114a, 114b, and 114c, image of the display pattern 106 can be brighter and clearer. This action can also be obtained in light of reference character p. That is, the light of display pattern 106 observed over the above left circularly polarized light filter is repeatedly generated as long as reflection of light is repeated between the cholesteric liquid crystal layer reflecting the entire range of visible light 105 and the display pattern 106, and they are overlapped as shown by the reference numeral 114a to 114c. In this way, the function in which light reached the display pattern 106 is used with no waste so as to yield observed light of the display pattern 106.

Figure 8:
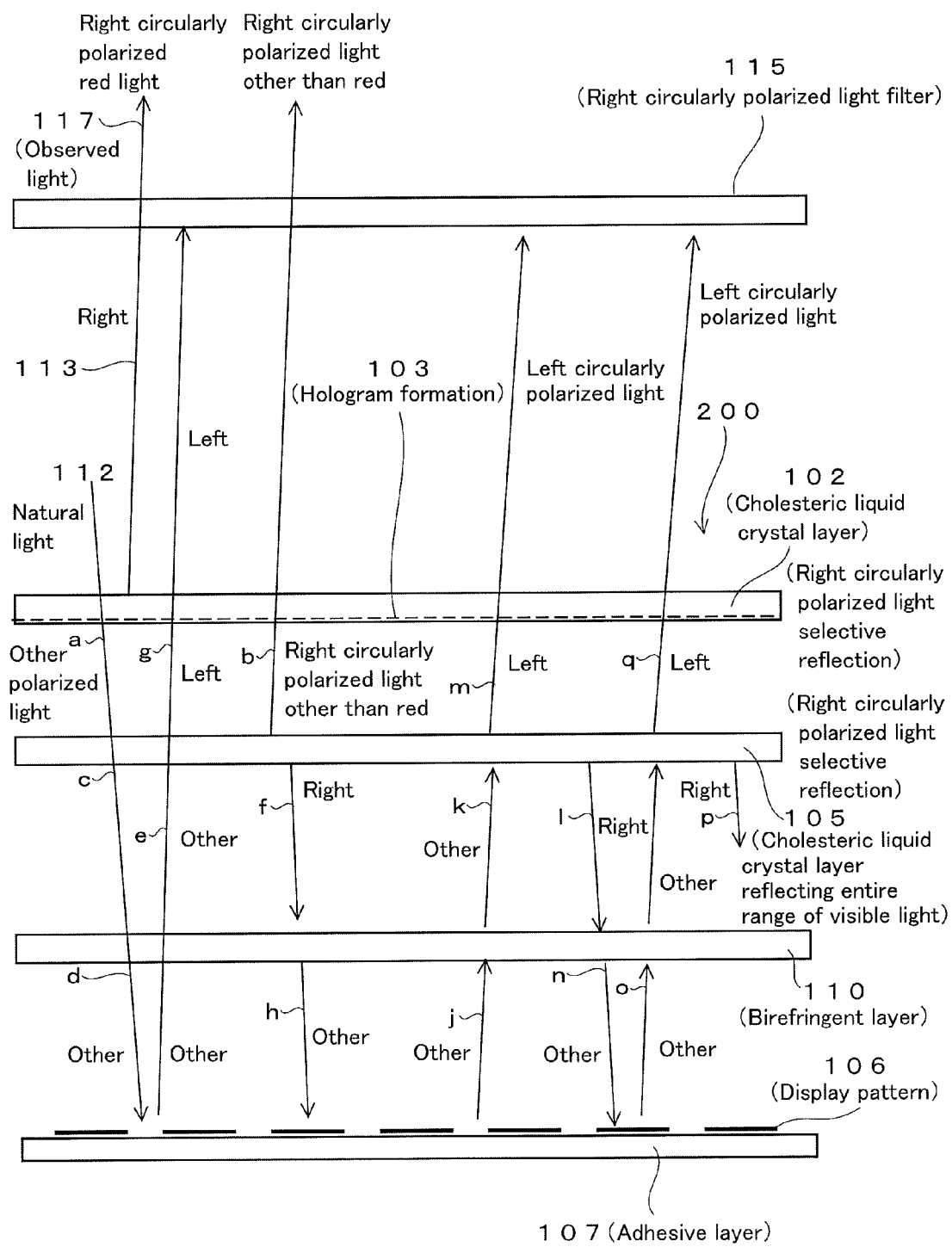
FIG. 8 is a principle view explaining optical function of an embodiment.

FIG. 8 shows a case in which the identification medium 200 is observed over the right circularly polarized light filter 115.

In this case, behavior of light inside of the identification medium 200 is the same as in the case of FIG. 7. Left circularly polarized light reflected from the identification medium 200 is blocked by the right circularly polarized light filter 115, and is not observed. On the other hand, right circularly polarized light 113 reflected from the cholesteric liquid crystal layer 102 transmits through the right circularly polarized light filter 115 and is observed by an observer as observed light 117. In this case, the display pattern 106 is not observed, and a hologram based on the hologram formation 103 is selectively observed.

As explained so far, only the display pattern 106 is seen in the case in which the identification medium 200 is observed over the left circularly polarized filter. In this case, reflection is repeated at a lower surface side of the cholesteric liquid crystal layer reflecting the entire range of visible light 105, and furthermore, reflecting light in which intensity of observed light 114a is increased by birefringent effect at the birefringent layer 110, is generated there.

The observed content explained above is similarly observed in both a case in which the circularly polarized light filter 111 or 114 is apart from the identification medium and a case in which they are in contact with the medium. Furthermore, the color shift effect in which color shifts to shorter wavelength side is observed by varying observing angle in the cholesteric liquid crystal, and also in the identification medium 200 and 200', the color shift can be observed by varying observing angle (for example, inclining the identification medium).

(3) Third Embodiment

Figure 9A:
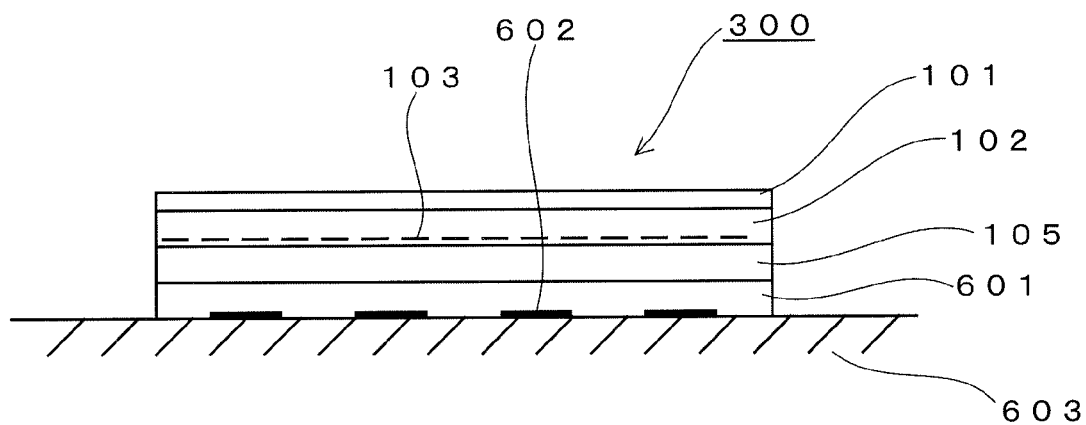
FIG. 9 is a cross-sectional view of an embodiment.
Figure 9B:
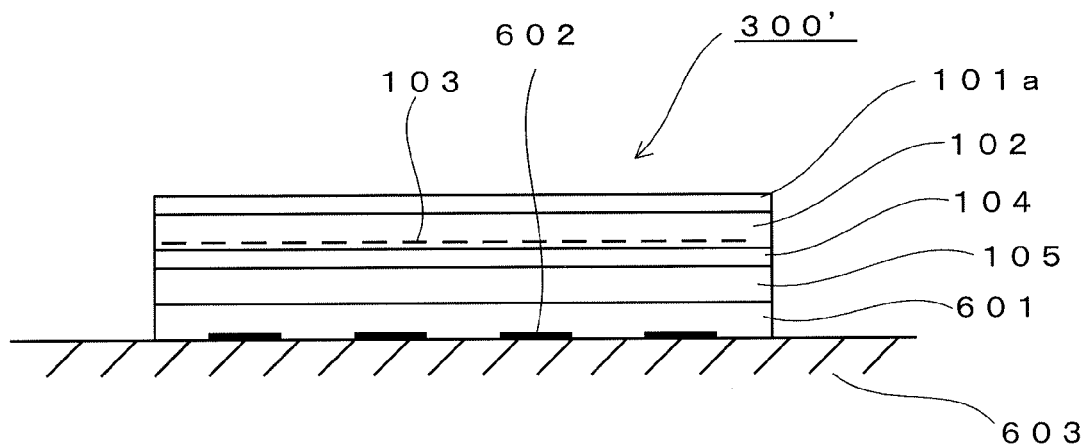

FIG. 9A shows an identification medium 300 of the embodiment. The identification medium 300 has a structure in which the protection layer 101, the cholesteric liquid crystal layer 102 in which a hologram is formed 103, the cholesteric liquid crystal layer reflecting the entire range of visible light 105, and an adhesive layer 601 are layered seen from the side of observation. FIG. 9 further shows an object for authentication (article) 603 on which a display pattern 602 is formed thereon. Here, elements having reference numerals common with FIG. 1 have the same content as explained regarding FIG. 1. In this example, a condition in which the identification medium 300 is attached on the object 603 by adhering force of the adhesive layer 601 is shown. FIG. 9B shows an identification medium 300' having a structure in which the COP layer 104 is sandwiched between the cholesteric liquid crystal layer 102 and the cholesteric liquid crystal layer reflecting the entire range of visible light 105 in the identification medium 300 shown in FIG. 9A.

The adhesive layer 601 is an adhesive agent of optically transparent material. The display pattern 602 is a printed pattern which is formed on the surface of the object 601, and it may be kinds of pictures, characters, logos, patterns, or code displays such as barcodes or the like. Optical characteristics of the identification medium 300 are the same as those of the identification medium 100 of FIG. 1. Differences between the identification medium 300 and the identification medium 100 of FIG. 1 are that the identification medium 100 has the display pattern 106 which is a base of images to be identified, whereas the identification medium 300 has the display pattern 602 at the object 603 side as an image to be identified.

It should be noted that a separator (releasing paper), which is not shown, is attached on a back surface side of the adhesive layer 601 in a condition in which the medium is not attached on the object, that is, a condition in which the identification medium 300 is not used yet. This separator is removed from the back surface of the adhesive layer 601 in use, and the identification medium 300 is attached to the object by adhering function of the adhesive layer 601. One example of this condition is shown in FIG. 9. Furthermore, in the structure shown in FIG. 9, it is possible to obtain an optical function that is similar to the case explained with reference to FIGS. 7 and 8 in which a birefringent layer is arranged at a lower surface side of the cholesteric liquid crystal layer reflecting the entire range of visible light 105.

(4) Other Disclosure 1
(Structure)

Figure 10:
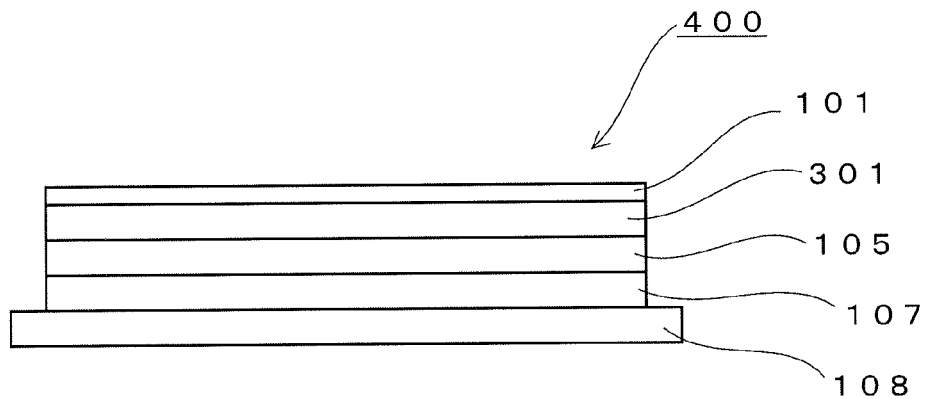
FIG. 10 is a cross-sectional view of an embodiment.

FIG. 10 shows an identification medium 400. The identification medium 400 has a structure in which the protection layer 101, an optically anisotropic layer 301, the cholesteric liquid crystal layer reflecting the entire range of visible light 105, the adhesive layer 107, and the separator 108 are layered seen from the side of observation. Here, elements having reference numerals in common with FIG. 1 have content the same as explained regarding FIG. 1.

The optically anisotropic layer 301 is constructed by a polymer material that has birefringent property and is orientating. Material is used in which polymerization reaction of polymer occurs by irradiating light so as to determine orientating conditions. The polymer in the optically anisotropic layer has unreacted reactive groups. The unreacted reactive groups react and form cross-linking of polymer chains by being exposed to light; the extent of the cross-linking of the polymer chain varies depending on conditions of light exposure, and as a result, retardation values vary so as to form a birefringent pattern.

It is desirable that the retardation of the optical anisotropic layer 301 at 20° C. be not less than 5 nm, more desirably in a range from 10 nm to 10,000 nm, and most desirably in a range from 20 nm to 2,000 nm.

In this example, as a method for production of the optically anisotropic layer, the following method is employed: coating a solution containing liquid crystal compound having at least one reactive group, drying it to form a liquid crystal phase, and irradiating ionizing radiation to polymerize and fix it. This method is disclosed in Japanese Unexamined Patent Application Publication No. 2009-175208. It should be noted that the publication also discloses other methods, such as a method in which a layer is stretched in which monomer having at least two reactive groups is polymerized and fixed, a method in which a layer is stretched consisting of polymer after introducing reactive groups by using coupling agent at the layer, and a method in which reactive groups are introduced by using coupling agent after stretching a layer consisting of polymer. Furthermore, as mentioned below, the optical anisotropic layer of the present invention can be one which is formed by transferring. The thickness of the optical anisotropic layer 301 is desirably in a range from 0.1 to 20 μm, and more desirably in a range from 0.5 to 10 μm.

Hereinafter one example of a forming process of the optically anisotropic layer 301 is explained. First, a composition containing liquid crystal compound (for example, coating liquid) is coated on an easily separatable layer on which orientation treatment is performed. In this example, a mixture in which bar-shape liquid crystal, horizontal orientating agent, cation type photopolymerization initiator, polymerization controlling agent and methylethylketone are mixed is used as the liquid crystal compound. Then, after making an orientating condition exhibiting a desired liquid crystal phase, the orientating condition is fixed by irradiation with ionizing radiation.

In this example, the orientating condition of the liquid crystal compound orientated is fixed by photopolymerization reaction. Irradiation energy of the photoradiation is selected at 25 to 800 mJ/cm². As irradiating wavelength, ultraviolet light having a peak in 250 to 450 nm is used.

Figure 11:
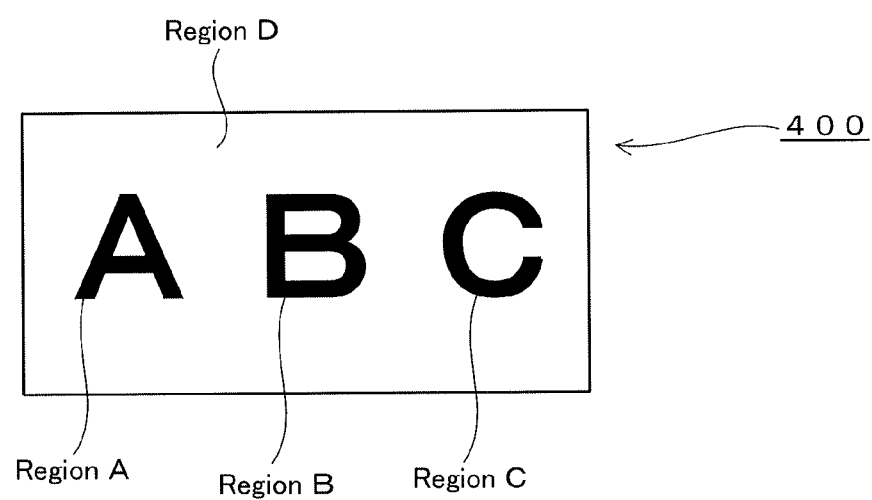
FIG. 11 is a conceptual view showing how an embodiment appears.

At this time, light drawing is performed in a pattern shown in FIG. 11 so that phase difference of transmitted light occurring in region A (birefringent effect), phase difference of transmitted light occurring in region B (birefringent effect) and phase difference of transmitted light occurring in region C (birefringent effect) are controlled to be made different from each other. That is, in each region, the optical anisotropy is made different from the others. It should be noted that region D is made merely a light transmissive layer in which birefringent effect does not occur without performing light irradiation.

The above-mentioned control of phase difference is performed by varying the amount of light to irradiate (light exposure amount). After that, conditions for fixation of orientating conditions according to irradiated light amount is decided by applying heat treatment at 200° C., and the optically anisotropic layer 301 in which condition of birefringent is partially different can be obtained. It should be noted that unless light is irradiated, orientating condition is disturbed during heat treatment, and birefringent property of the region may be extinguished (becoming merely a light transmissive layer). The above heat treatment can be performed at a temperature selected from the range of from 50 to 400° C.

In this way, the optically anisotropic layer 301 can be obtained, in which refraction indexes of orthogonal directions in a plane are different, and that condition of difference is also different in each of the region A, region B, and region C shown in FIG. 11. In this example, phase differences that occurred in these regions are set so that the region A, region B, and region C are seen in a different color during observation using the circularly polarized light filter. It should be noted that the region D is formed as merely a light transmissive region having no refraction index anisotropy.

After obtaining the optically anisotropic layer 301, it is separated from the easily separatable layer, which is not shown, and is fixed to the protection layer 101. After that, it is layered with the cholesteric liquid crystal layer reflecting the entire range of visible light 105, the adhesive layer 107 is formed, and the separator 108 is attached, so as to obtain the identification medium 400 shown in FIG. 10.

Fixation of the identification medium 400 to an object is performed by removing the separator 108 and contacting the adhesive layer 107 to the object. This is the same as in the case of the identification medium 100 of FIG. 1. It should be noted that the rotating direction of the circularly polarized light selectively reflected by the cholesteric liquid crystal layer reflecting the entire range of visible light 105 is not limited to right rotating, and it can be left rotating.

(Optical Function)

In a case in which the identification medium 400 of FIG. 10 is directly seen from an upper direction of the figure, since birefringent effect of the regions A to C cannot be seen and the region D is merely a light transmissive layer, the display of ABC shown in FIG. 11 cannot be observed. In a case in which the identification medium 400 is observed over the right circularly polarized light filter, light which has been transmitted through the regions ABC is elliptically polarized by birefringent effect, and since the condition of elliptically polarized light is different in each of regions ABC, each of the regions ABC is seen in a different color from the others. In the region D, light that is reflected from the cholesteric liquid crystal layer reflecting the entire range of visible light 105 is observed, that is, reflecting light having a metallic sheen is observed, for example.

The reason the reflecting light from the regions A, B, and C are seen in different colors is as follows. That is, phase difference occurs in polarized light component which is orthogonal in the optically anisotropic layer 301 in each of the regions ABC, since the phase difference has a dependency of wavelength, when focusing on a certain polarized light component, color can be seen of which the center of wavelength corresponds to a phase difference occurring on the optically anisotropic layer 301. Therefore, a different color is observed depending on phase differences occurred. Here, since the phase difference that occurs is set to be different in parts of regions A, B, and C, in an observation over the circularly polarized light filter, mutually different colors can be seen in the parts of regions A, B, and C.

Furthermore, when seeing the identification medium 400 over the left circularly polarized light filter, the parts of regions A, B, and C are seen in a color different from the case of using the right circularly polarized light filter. This is because polarized light component extracted by the circularly polarized light filter is different from the case of using the right circularly polarized light filter. Also in this case, each of the regions A, B, C is seen in different color from the others. Furthermore, since reflected light of right circularly polarized light from the region D is blocked by the left circularly polarized light filter, reflected light from the cholesteric liquid crystal layer reflecting the entire range of visible light 105 cannot be seen, and the adhesive layer 107 which is a background of the cholesteric liquid crystal layer reflecting the entire range of visible light 105 can be seen. Here, color is seen in the region D part if the adhesive layer 107 is colored, and a further lower layer of the adhesive layer 107 is seen in the region D part if the adhesive layer 107 is transparent.

As mentioned above, FIG. 10 discloses the structure in which the optically anisotropic layer having multiple regions, each having different conditions of optical anisotropy, and the cholesteric liquid crystal layer reflecting the entire range of visible light is arranged seen from the observation side.

(4) Other Disclosure 2

Figure 12:
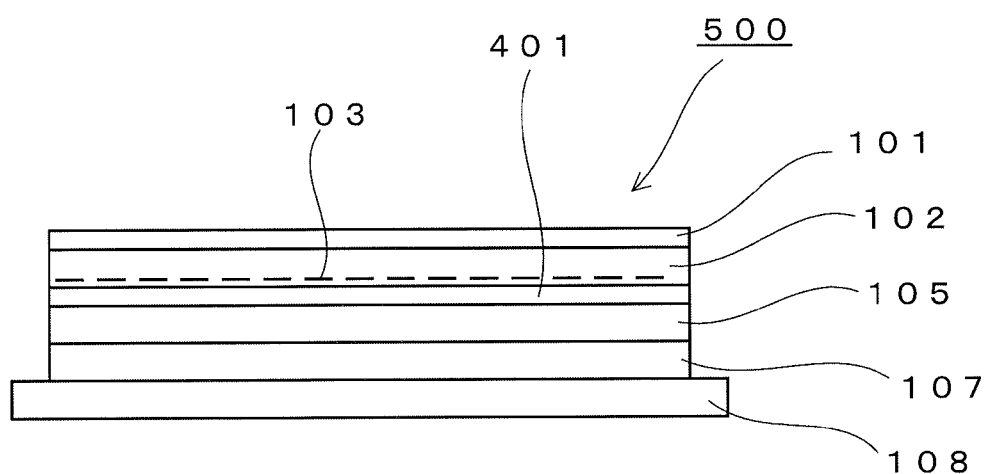
FIG. 12 is a cross-sectional view of an embodiment.

FIG. 12 shows an identification medium 500. The identification medium 500 has a structure in which the protection layer 101, the cholesteric liquid crystal layer in which a hologram is formed 103, a λ/2 plate 401, the cholesteric liquid crystal layer reflecting the entire range of visible light 105, the adhesive layer 107, and the separator 108 are layered in this order seen from the observation side. Here, the cholesteric liquid crystal layer 102 is set to selectively reflect right circularly polarized red light, and the cholesteric liquid crystal layer reflecting the entire range of visible light 105 is set to reflect right circularly polarized light of the entire range of visible light.

In a case in which the identification medium 500 is observed from an upper direction of the figure over right circularly polarized light filter, the right circularly polarized red light for example which is reflected from the cholesteric liquid crystal layer 102 is observed. Therefore, a hologram caused by the hologram formation 103 is observed. In a case in which the identification medium 500 is observed over the left circularly polarized light filter, reflected light from the cholesteric liquid crystal layer 102 cannot be observed. On the other hand, since reflected right circularly polarized light from the cholesteric liquid crystal layer reflecting the entire range of visible light 105 is reversed at the λ/2 plate 401 to be left circularly polarized light and transmits through the cholesteric liquid crystal layer 102 to an upper direction as it is, the reflected light from the cholesteric liquid crystal layer reflecting the entire range of visible light 105 becomes possible to be observed. Since this reflected light is left circularly polarized light and is observed as light of the entire range of visible light, the reflected light having a metallic sheen for example is observed while the hologram of the cholesteric liquid layer 102 cannot be seen.

It should be noted that the λ/2 plate 401 can be omitted in a case in which rotating direction of the circularly polarized light reflected from the cholesteric liquid crystal layer reflecting the entire range of visible light 105 is set in the left rotation direction. Furthermore, it is possible that wavelength selectively reflected by the cholesteric liquid crystal layer 102 is set to a color other than red, and it is possible that rotation direction of circularly polarized light selectively reflected is set to the left rotation.

As mentioned above, FIG. 12 discloses a structure in which the cholesteric liquid crystal layer in which a hologram is formed, the λ/2 plate, and the cholesteric liquid crystal layer reflecting the entire range of visible light which selectively reflects a circularly polarized light having the same rotation direction as the cholesteric liquid crystal layer is arranged seen from the observation side. It should be noted that in order to omit the λ/2 plate, the rotation direction of the circularly polarized light reflected from the cholesteric liquid crystal layer reflecting the entire range of visible light is set opposite to that of the cholesteric liquid crystal layer.

The present invention can be used in an authentication technique.

The invention claimed is:

1. An identification medium comprising a structure, the structure comprising, in the following order as seen from the side of observation:
   a primary cholesteric liquid crystal layer in which a hologram is formed, and which selectively reflects circularly polarized light of a specific rotating direction of a specific central wavelength;
   a secondary cholesteric liquid crystal layer which has reflection characteristics reflecting the entire range of visible light, and which reflects circularly polarized light of the same rotating direction as the circularly polarized light reflected from the primary cholesteric liquid crystal layer; and
   a display pattern having a specific content displayed.

2. The identification medium according to claim 1, wherein a light transmissive layer having refraction index anisotropy is arranged between the secondary cholesteric liquid crystal layer and the display pattern.

3. The identification medium according to claim 2, wherein the medium further comprising a cycloolefin polymer layer between the primary cholesteric liquid crystal layer and the secondary cholesteric liquid crystal layer,
   and the primary cholesteric liquid crystal layer is contacted to one surface of the cycloolefin polymer layer and the secondary cholesteric liquid crystal layer is contacted to the other surface of the cycloolefin polymer.

4. The identification medium according to claim 1, wherein the medium further comprising a cycloolefin polymer layer between the primary cholesteric liquid crystal layer and the secondary cholesteric liquid crystal layer,
   and the primary cholesteric liquid crystal layer is contacted to one surface of the cycloolefin polymer layer and the secondary cholesteric liquid crystal layer is contacted to the other surface of the cycloolefin polymer.

5. The identification medium according to claim 1, wherein white, mirror surface, metallic sheen, or whitish silver is observed when the secondary cholesteric liquid crystal layer is observed by the naked eye.

6. The identification medium according to claim 1, wherein a light component, which is reflected by the display pattern and cannot pass through the secondary cholesteric liquid crystal layer, is reflected by the secondary cholesteric liquid crystal layer and is then reflected by the display pattern, thereby being changed into another light component which can pass through the secondary cholesteric liquid crystal layer.

7. An identification medium comprising, in the following order as seen from the side of observation:
   a primary cholesteric liquid crystal layer in which a hologram is formed, and which selectively reflects circularly polarized light of a specific rotating direction of a specific central wavelength;
   a secondary cholesteric liquid crystal layer which has reflection characteristics reflecting the entire range of visible light, and which reflects circularly polarized light of the same rotating direction as the circularly polarized light reflected from the primary cholesteric liquid crystal layer; and
   an adhesive layer having light transmissive characteristics.

8. The identification medium according to claim 7, wherein the medium further comprising a cycloolefin polymer layer between the primary cholesteric liquid crystal layer and the secondary cholesteric liquid crystal layer,
   and the primary cholesteric liquid crystal layer is contacted to one surface of the cycloolefin polymer layer and the secondary cholesteric liquid crystal layer is contacted to the other surface of the cycloolefin polymer.

9. The identification medium according to claim 7, wherein white, mirror surface, metallic sheen, or whitish silver is observed when the secondary cholesteric liquid crystal layer is observed by the naked eye.

10. The identification medium according to claim 7, wherein a light component, which is reflected by an object for authentication and cannot pass through the secondary cholesteric liquid crystal layer toward the primary cholesteric liquid crystal layer, is reflected by the secondary cholesteric liquid crystal layer and is then reflected by the object, thereby being changed into another light component which can pass through the secondary cholesteric liquid crystal layer.

* * * * *